2,319,231

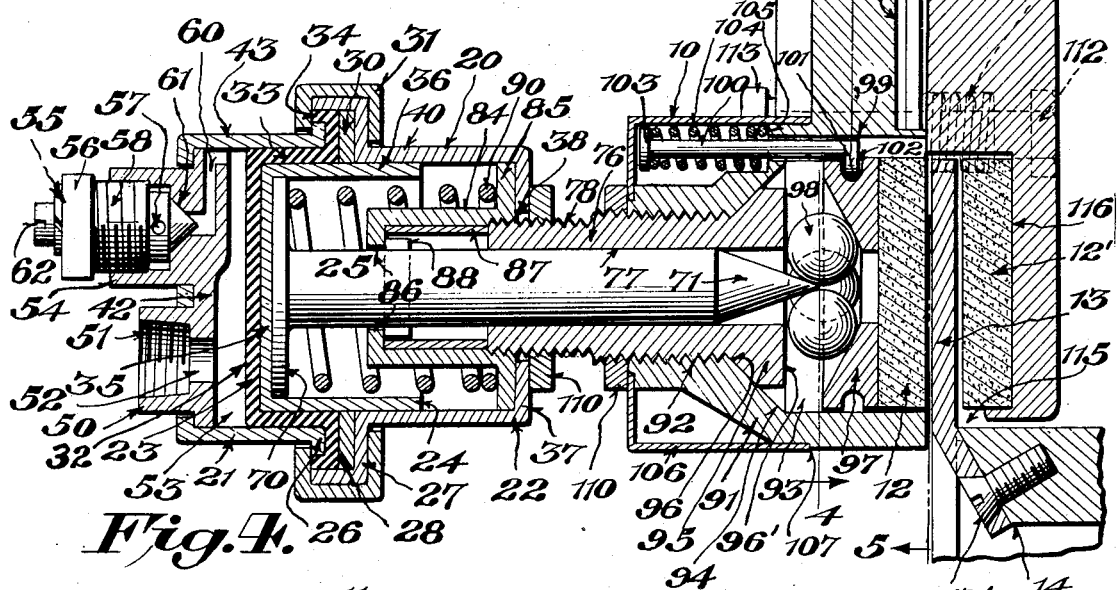
Fig.3.
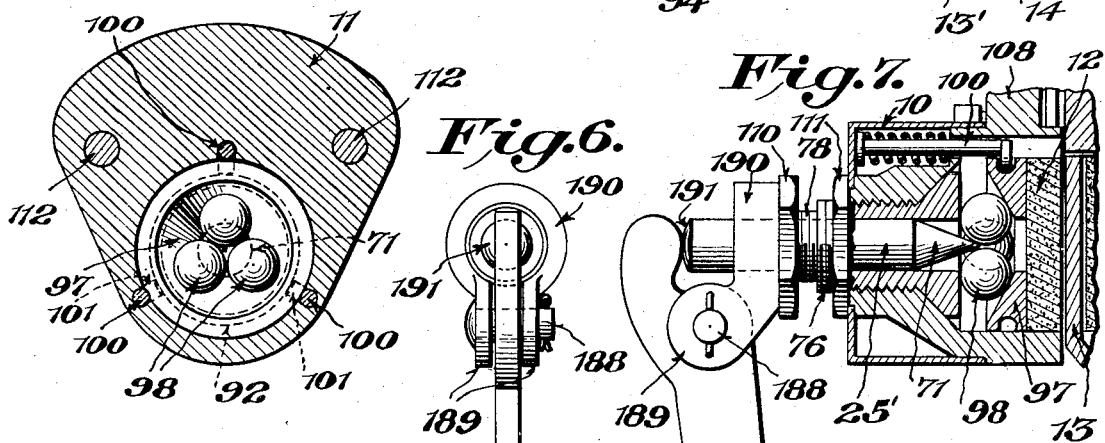
Fig.4. Fig.6. Fig.7.
Fig.5.
Inventor
Jesse G. Hawley,
By Allen T. St. Clair
Attorney Patented May 18, 1943

UNITED STATES PATENT OFFICE 2,319,231

POWER BOOSTER

Jesse G. Hawley, Painted Post, N. Y.

Application April 24, 1941, Serial No. 390,170

14 Claims. (Cl. 188—152)

This invention relates to the art of power units, and more particularly to devices for boosting the power imparted by a hydraulically or mechanically operated device for furnishing motive power.

While many devices have been developed for actuating moving parts, and for boosting power, these have generally been adapted for operating some particular type of mechanism and have lacked general utility as a power unit. Furthermore, such devices have not been capable of achieving the desired step-up in power without involving very complicated construction, and they have also lacked the desired degree of interchangeability for operating various mechanisms.

I have found that it is possible to produce a simple and inexpensive power booster of general utility and to operate it selectively by hydraulic or mechanical means.

It is therefore an object of this invention to provide a new and improved power booster.

It is another object to provide a hydraulically operated power booster.

It is a further object to provide a power booster which may be operated either hydraulically or mechanically.

It is an additional object to provide a sealed power unit combined with a power booster.

It is also an object to provide a simple and inexpensive power unit and power booster of general utility.

It is a special object to provide a power booster for actuating braking devices.

With the above and other objects in view, which will be apparent as the description proceeds, I have set forth my invention in the following specification and have illustrated it in the accompanying drawings, in which:

Fig. 3 is a vertical longitudinal section through the upper power unit, booster, and brake shown in Figs. 1 and 2;

Fig. 4 is a vertical section on the line 4—4 of Fig. 3;

Fig. 5 is a vertical section on the line 5—5 of Fig. 3;

Fig. 6 is an end elevation of a mechanically operated means;

Fig. 7 is a vertical longitudinal sectional view of the mechanically operated means shown in Fig. 6 in conjunction with the power booster of Fig. 3.

Figure 1:
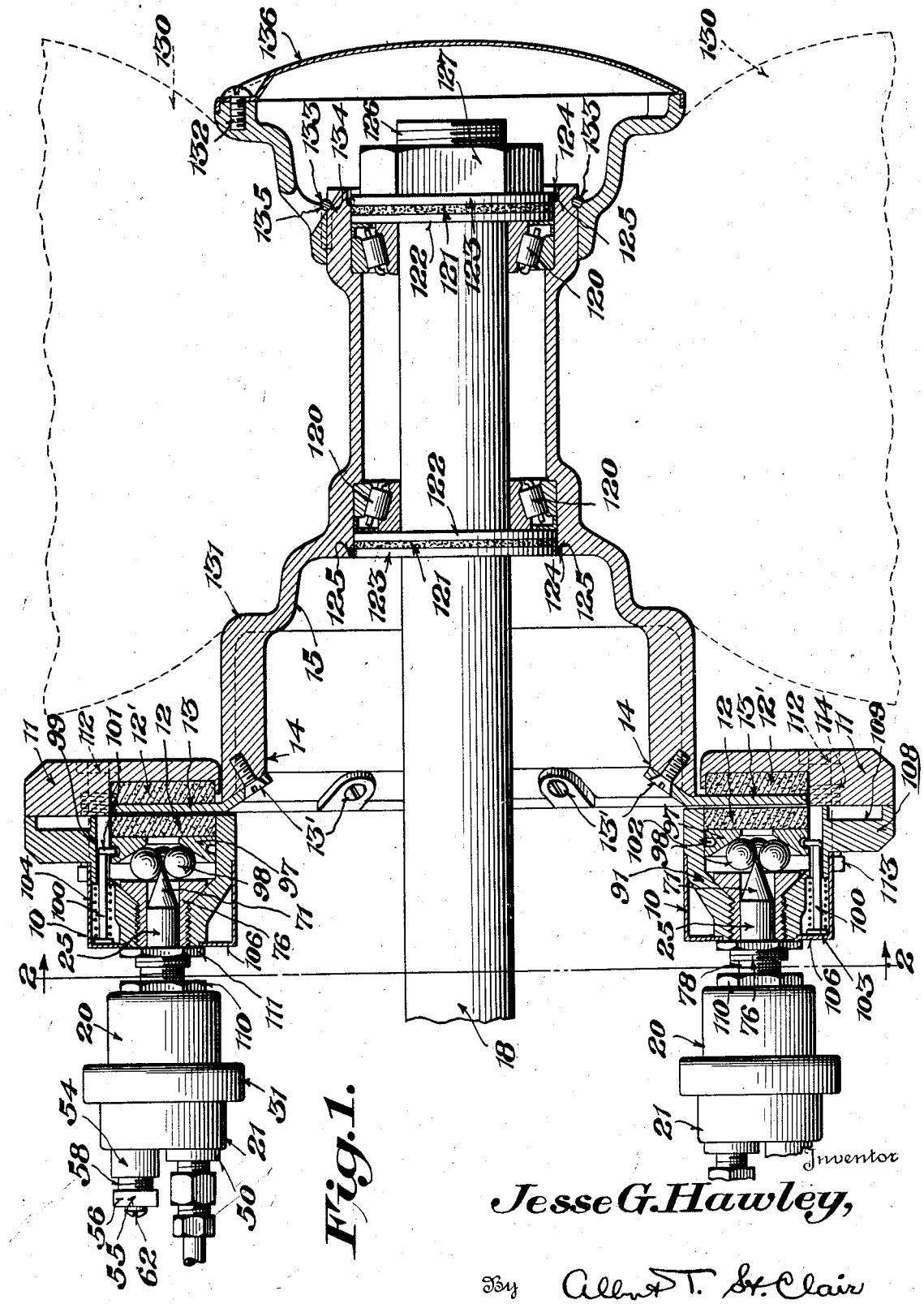
Figure 1 is a vertical longitudinal section showing my power booster used in connection with airplane wheel brakes.

Referring to the accompanying drawings, and more particularly to Figs. 1 and 3 thereof, my power booster 10 is shown in conjunction with a power unit 20, both of which will be described in detail hereinafter, a brake clamp 11, provided with brake lining 12, 12', and a braking disc 13. The latter is preferably a circular disc that is screwed or riveted, as at 13', to the outer end 14 of a wheel hub 15.

The preferred operating mechanism for use in conjunction with my power booster is a power unit 20, which is preferably of the type disclosed and claimed in my co-pending applications, Serial No. 337,102, filed May 24, 1940, and Serial No. 355,263, filed September 3, 1940. This preferably comprises a fluid cylinder 21, a piston cylinder 22, a resilient seal 23, a piston 24, and a piston rod 25.

As best shown in Fig. 3, fluid cylinder 21 and piston cylinder 22 are cup-shaped members terminating in circumferential flanges 26 and 27, respectively, between which a flange 28 on the resilient seal 23 and a spacer ring 30 are securely held by a clamping ring 31, which is securely clamped therearound by any convenient means, as a power press (not shown).

Resilient seal 23 is preformed and is resistant to oils. It is made of any suitable material, such as neoprene, buna rubber, or thiokol. As shown, it comprises a bottom portion 32 which is flat, side wall 33 at right angles thereto, and the aforementioned flange 28 which extends at right angles to the side wall 33 and terminates in a secondary flange 34 that is parallel to the side wall 33 but spaced therefrom.

The piston 24 comprises a head 35 and a circumferential flange 36 at right angles thereto. The head 35 and flange 36 are made just sufficiently smaller than the resilient seal 23 to permit the piston 24 to be inserted in the resilient seal without deforming it, and the internal diameter of the spacer ring 30 is only sufficiently larger than the diameter of the piston 24 to permit its moving freely therethrough.

Piston cylinder 22 comprises a bottom portion 37, which is flat but is provided with an orifice 38, for a purpose to be described later, and a side wall 40, whose internal diameter is equal to the internal diameter of the side wall 33 of resilient seal 23, and which is only sufficiently larger than the external diameter of the flange 36 on piston 24 to permit it to move freely therethrough. Side wall 40 terminates in the flange 27 described above, and this, in turn, is provided with a right angular extension 41, which is parallel to the side wall 40 and of a suitable internal diameter such that it just accommodates spacer ring 30 and flange 34 of resilient seal 23.

Fluid cylinder 21 comprises a bottom portion 42 provided with a side wall 43 that is of just sufficient internal diameter to allow the side wall 33 of resilient seal 23 to fit therein without deformation. Side wall 43 terminates in flange 26 discussed above.

Bottom portion 42 is provided with two bosses 50, 54 that are preferably formed integral therewith. Boss 50 is internally threaded at 51 to receive any suitable coupling (not shown), and is provided with an orifice 52 to permit fluid (not shown) to enter a chamber 53 formed in fluid cylinder 21 between its bottom portion 42 and the resilient seal 23. Boss 54 is preferably internally threaded to receive a correspondingly threaded bleeder plug 55, provided with a square head 56. Bleeder plug 55 communicates with the exterior through a longitudinal orifice (not shown) that communicates with a transverse orifice 57, in a shank 58 of reduced diameter. Orifice 57 can communicate with a transverse orifice 60 in bottom portion 42 of fluid cylinder 21, and thence with the chamber 53 when the bleeder plug 55 is partially unscrewed from its seat 61. This may conveniently be done with a screw driver by inserting the latter in a transverse slot 62 in the head of the bleeder plug 55.

Piston rod 25 is provided with a flat head 70 and a tapered end 71. Piston rod 25 operates in, and is guided by, a power head 76 that has a longitudinal aperture 77 of just sufficiently larger internal diameter than piston rod 25 to allow the latter to move therein without undue friction. Power head 76 is preferably a screw machine part that is externally threaded at 78.

The travel of piston rod 25 is preferably controlled by a spacer 84, provided with an external flange 85, whose external diameter corresponds to the internal diameter of the side wall 40 of piston cylinder 24, and with an orifice 86 that is of large enough diameter to permit the piston rod 25 to move therethrough without undue friction. A spacer sleeve 87, that is of sufficiently smaller external diameter to fit snugly in spacer 84, and of larger internal diameter than the orifice 86, is designed to retain a stop pin 88, carried by the piston rod 25 but projecting therebeyond, so as to limit the travel of the piston rod 25 between the spacer 84 and the inner end of power head 76. Spacer sleeve 87 is preferably separate from the threaded portion 78 of power head 76. Spacer 84 is also internally threaded to engage the inner threaded end 78 of power head 76.

A heavy coil spring 90 is telescoped around spacer 84, and bears against the flange 85 thereof and against the head 70 of piston rod 25, to normally force the latter into engagement with piston 24 and cause that to bear against resilient bottom portion 32 of resilient seal 23, but spring 90 is of insufficient power to stretch the resilient seal 23. The latter is free of either compression or distention when it is in normal position.

The power for operating my power booster may be furnished by the hydraulic power source just described, or by any other suitable power source, such as a mechanical power source, shown in Figs. 6 and 7, which will be described later.

My power booster 10 comprises a housing 91 which is internally threaded at 92 to engage the threaded portion 78 of the power head 76. Housing 91 is also provided with an enlarged recess 93 which is connected with the internally threaded portion by an inclined face 94. The outer end of the power head 76 is also enlarged at 95 and provided with a correspondingly inclined portion 96, for cooperation with the inclined face 94 of the housing 91, and a flat operating face 96'. Housing 91 is also provided with a separate concave-faced pressure disc 97. Three ball bearings 98 are interposed between the flat face 96' of the outer end of power head 76 and the concave-faced pressure disc 97 and are actuated as described later. The pressure disc 97 is spring-pressed toward the enlarged end 95 of power head 76 through a plurality of retaining rods 100 which are housed in longitudinal recesses 99 in the inner periphery of housing 91. Retaining rods 100 each terminate in a portion 101 disposed at right angles thereto for reception in a recess 102 in the pressure disc 97. At their opposite ends, the retaining rods 100 are headed at 103, and a coil spring 104 is provided for each of the retaining rods 100 and is adapted to bear against the head 103, and a seat 105 formed in the periphery of the housing 91. This spring mechanism is protected by a dust cap 106 which is adapted to seat in a recess 107 on the outer end of the housing 91, and bear against a flange 108 integral with the housing 91. Flange 108 is recessed on its under side 109 to lighten it. Lock nuts 110, 111 are provided on the power head 76 to retain the power unit 20 and dust cap 106, respectively, in the desired positions thereon.

The brake clamp 11 is secured to the housing 91 by bolts 112 and nuts 113 which pass through the flange 108 on the housing 91 and the brake clamp 11, and are provided with springs 114 telescoped around these bolts to give the brake clamps a slight yielding movement during the braking action.

With the construction described, when it is desired to actuate the power booster, the operator supplies actuating fluid to the power unit 20 by moving a lever or pressing a button (not shown) which causes fluid from any suitable outside source (not shown) to enter chamber 53 in fluid cylinder 21, through the orifice 52 and bear against the exposed portion 32 of resilient seal 23. This moves piston 24 and piston rod 25 forward against the pressure of spring 90 and forces the tapered end 71 of piston rod 25 outwardly into contact with the ball bearings 98 to force these into contact with the concave-faced pressure disc 97. As the tapered end 71 is forced outwardly, the ball bearings are caused to ride up the inclined portion of the face of the pressure disc, which resists the spreading of the ball bearings, and exert a stepped-up pressure against the pressure disc and any parts in its path of travel. As the pressure disc 97 is forced outwardly, springs 104 are compressed to provide the means for withdrawing the pressure disc from the parts which it actuates when the tapered end 71 is subsequently withdrawn.

By varying the taper of the end 71 of piston rod 25 and the angle of inclination of the concave-faced pressure disc 97, any desired degree of increase in the power applied by the piston rod 25 can be obtained, and this advantage is gained in a straight line push. In the construction shown, the taper on the end 71 of piston rod 25 is 20° from its centerline and the taper on the concave-faced pressure disc 97 is 30°. Consequently, if the piston rod 25 is moved forward ¼ inch, the pressure disc 97 only moves forward 1/16 inch, so that if 1,000 pounds is exerted against the piston rod 25, 4,000 pounds pressure will be delivered by the pressure disc 97.

In the embodiment shown in the drawings, the pressure exerted by the pressure disc 97 is exerted against the innermost brake lining 12, thus forcing the latter into contact with the braking disc 13. This action simultaneously pulls the outer brake lining 12', carried by the outer portion of the brake clamp 11, into contact with the opposite side of the braking disc 13 to complete the brake application.

The brake clamps 11 are cut away at their lower side to provide an entrance slot 115 to accommodate the brake disc 13, and with a recessed portion 116 to receive the brake lining 12'.

As shown in Fig. 1, the axle 18 is supported in the wheel hub 15 by a pair of Timken bearings 120, each of which is retained in position by a washer assembly comprising a felt washer 121 protected by metal washers 122 and 123 and a spring retaining ring 124 which is received in a recess 125 in the wheel hub 15.

At its outer end, axle 18 is provided with threads 126 to receive a retaining nut 127.

A tire 130 is mounted on the wheel hub 15 and is retained thereon between flange 131 on the inner side of the hub and a retaining flange 132 on the outer side of the hub. The latter is retained in position by a spring retaining ring 133 which is received in registering recesses 134 and 135 in the wheel hub 15 and retaining flange 132, respectively.

A light metal hub cap 136 is bolted to, or spring held in, the retaining flange 132 to prevent the entrance of dirt and moisture.

The braking disc 13, which is mounted externally of the wheel hub 15 in Fig. 1, may be replaced by a braking disc that is mounted internally.

Figure 8:
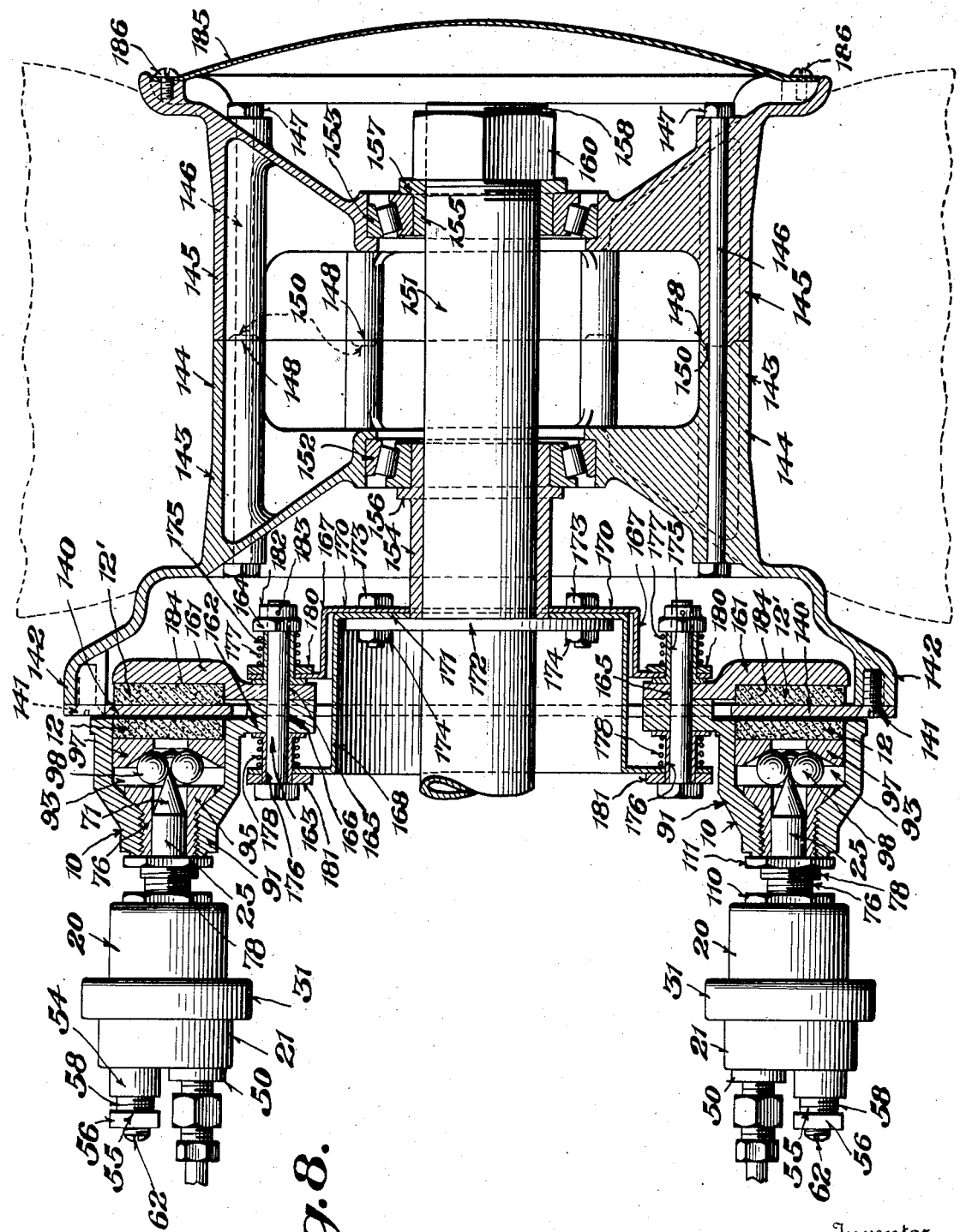
Fig. 8 is a vertical longitudinal section, corresponding to Fig. 1, showing a modified form of brake.

As shown in Fig. 8, a braking disc 140 is screwed or riveted at 141 to the outer end 142 of a wheel hub 143.

In this modification, the power units 20 and the power boosters 10 are preferably the same as disclosed in conjunction with Figs. 1 and 3, except that the shape of the flange 108 of housing 91, of brake clamp 11, and of the spring-pressed bolt construction for retaining these parts in the desired relationship, are changed as indicated below. Although omitted from Fig. 8, for the sake of clarity, retaining rods 100, coil springs 104, and dust cap 106 are provided in the same way as in Fig. 3.

As shown in Fig. 8, the wheel hub 143 is preferably formed in two parts 144, 145 which are retained in assembled position by bolts 146 and nuts 147. The positioning of parts 144, 145 is preferably facilitated by providing them with co-operating lugs 148 and recesses 150.

An axle 151 is supported in the wheel hub 143 by a pair of Timken bearings 152, 153, which are retained in position by a pair of sleeves 154, 155 having flanges 156, 157, respectively, for contact with the bearings 152, 153. Axle 151 is threaded at 158 to receive a retaining nut 160, which is drawn up tight against the flange 157 of sleeve 155 to hold the parts in assembled position.

Brake clamps 161 cooperate with flanges 162 on the housing 91, through the aid of bolts 163 and nuts 164, the bolts 163 passing through registering orifices 165, 166 in the brake clamps 161 and flanges 162. The bolts 163 also hold in position two spacing collars 167, 168 which are provided with flanges 170, 171, respectively, that engage the periphery of spacing sleeve 154. The flanges 170, 171 are secured to one another and to a retaining ring 172 by bolts 173 and nuts 174. Flanged sleeves 175, 176 are mounted on bolts 163 on opposite sides of the clamp 161 and flange 162, and are provided with coil springs 177, 178 which permit a limited movement for the clamp 161 with respect to the flange 162 as the brake is being applied. This allows the clamp type brake to float and provide equal pressure on the braking disc without distorting it.

Washers 180, 181, and 182 are provided for the bolts 163, and the washers 182 are retained in position in any desired way, as by cotter pins 183.

The construction just described results in the secure anchoring of the spacing collars 167, 168. More than a limited movement away from the hub 143 is prevented by the contact of clamps 161 and brake lining 12' against the braking disc 140. Movement of the spacing collars 167, 168 toward hub 143 is prevented by the contact of circular plate 172 against the end of sleeve 154, whose further movement is prevented by the contact of flange 156 against bearing 152. The flange 157 of sleeve 155 bears against bearing 153 in a similar manner.

As shown in Fig. 8, the brake lining 12' is received in a recessed portion 184 of brake clamp 161. Also, the housing 91 of my power booster overlies the end 142 of the hub 143.

A dust cover 185 is provided for the outer end of hub 143 and may be secured thereto in any desired manner, as by the screws 186.

In the embodiment shown in Fig. 8, when the power unit 20 is actuated and the tapered end 71 of piston rod 25 bears against the ball bearings 98 to cause them to ride on the inclined face of pressure disc 97, brake lining 12 is forced against braking disc 140, and this, in turn, through the spring-pressed construction previously described, pulls the brake lining 12', carried by brake clamp 161, into contact with the opposite side of the braking disc 140. When the piston rod 25 is withdrawn under the influence of spring 90, the spring mechanism described above releases the pressure of brake lining 12' against braking disc 140, allowing the latter to turn freely between the brake linings 12 and 12'.

As shown in Figs. 6 and 7, my power booster 10 may be operated mechanically through the aid of a lever 187, which is preferably pivotally mounted at 188 between a pair of lugs 189 projecting from a sleeve 190. The latter is threaded onto the threaded portion 78 of power head 76 and is held in the desired adjustment by lock nut 110. In this modification, the parts of the power booster correspond to that shown and described in connection with Fig. 3.

When it is desired to operate the power booster mechanically, it is merely necessary to pull outwardly on the end of the operating lever 187, which will rock it on its pivot 188 so it will bear against the outer end 191 of an operating plunger 25' to force its tapered end 71 into contact with the ball bearings 98 and cause them to ride upwardly on pressure disc 97. The outer end of lever 187 may be connected to any desired lever or pull cord (not shown).

The parts of my brake construction and related mechanism may be made of any desired materials. In general, however, I prefer to make the braking disc of chromium plated carbon steel or stainless steel. For airplane use, the wheel hub is preferably of light weight material, such as aluminum or magnesium alloys of the Dow Metal type. The clamp is also preferably made of Dow Metal or Lynite. The brake lining may be of any desired material or materials, such as the conventional asbestos brake lining or leather. The latter has been found to be particularly satisfactory.

Figure 2:
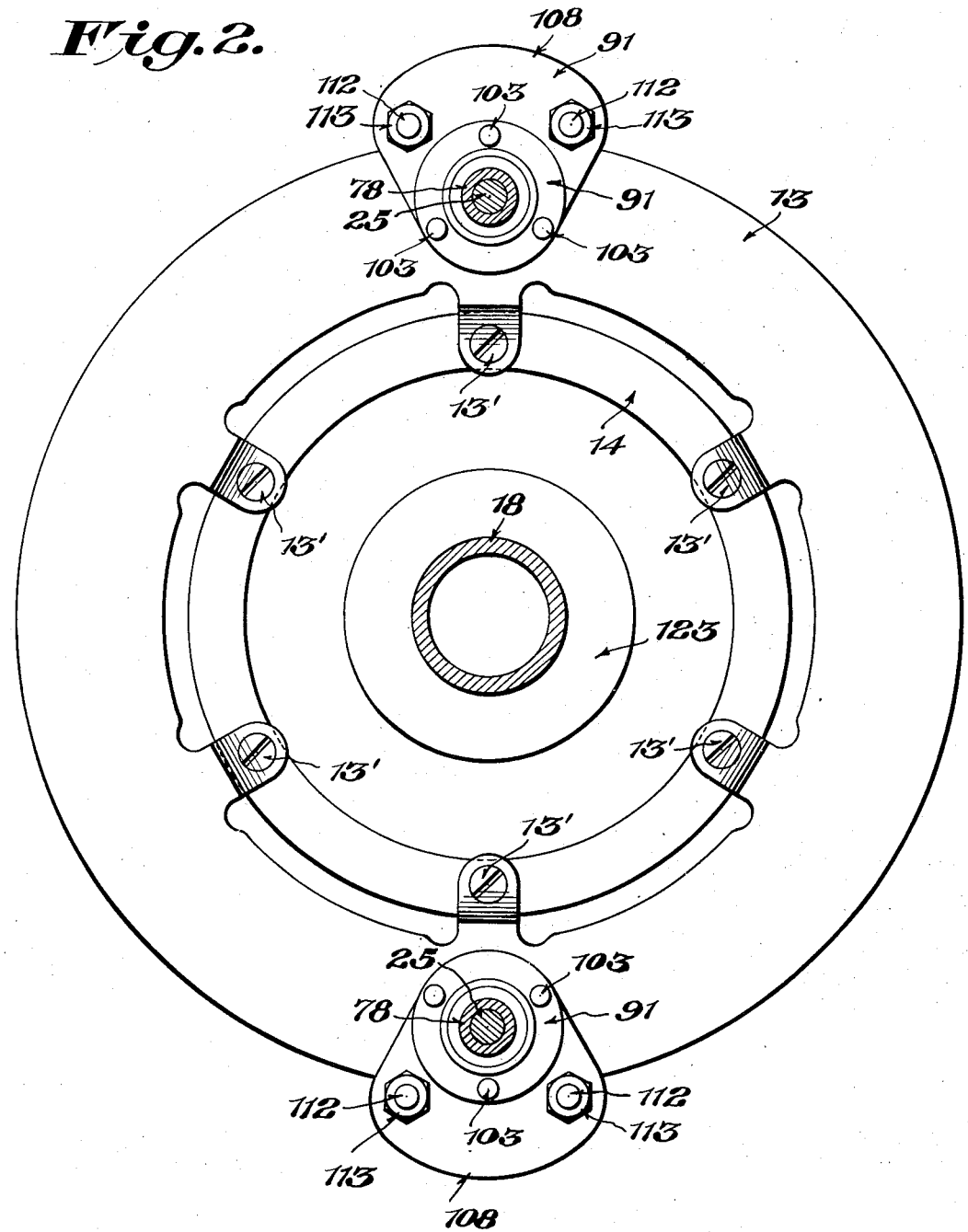
Fig. 2 is a vertical transverse section, on an enlarged scale, on the line 2—2 of Fig. 1, with certain parts removed.

While I have only shown two of my improved power boosters, power units, and related brake mechanisms in Figs. 1, 2, and 8, it will be understood that I may use one or any desired number of these power unit clamp brakes. Furthermore, these power units may be varied in diameter, and the amount of the operating fluid supplied to them may be varied, and all of these conditions will vary the amount of braking pressure. Also, by a proper distribution of the power unit brakes around the periphery of the circular disc, a substantially equal pressure may be exerted around its entire periphery, and, by the use of proper springs 114, the braking thrust can be properly balanced. Also, in view of the simple construction of the parts shown, any broken or damaged unit may easily be replaced and a new unit substituted without disassembling the wheel or the tire.

Although my invention has been disclosed herein in connection with a new and useful brake which is capable of general application, but which is particularly adapted for airplane use, it will be understood that the present invention is primarily directed to my improved booster. In view, however, of the new and improved result obtained by using my new power unit and power booster to form a new and useful brake assembly, it will also be claimed in conjunction with the brake elements.

In addition to its usefulness in conjunction with brakes, my improved booster may be used for many other purposes. Without in any way limiting myself thereto, it may be stated that it is useful in presses, such as arbor presses and punch presses, or for exerting a sustained pressure, as when cementing bands of sandpaper or emery paper. In many of these uses, it makes possible the development of the desired pressure in a small press instead of requiring the use of a big press; in other cases, it results in the production of a greater pressure than could be withstood by the normal press elements without stripping the teeth from the pinion gear or gear rack if the desired pressure were applied directly to them. It is a particular point of my improved power booster that the pressure desired is obtained in a straight line push.

It will therefore be apparent that I have developed a simple and efficient means of boosting the power applied by a given source of power and that by varying the angle of the tapered end of the piston rod or of the operating plunger, as well as the angle of the face of the pressure disc, I am able to obtain a marked increase in the power delivered by the power unit, and that this may be varied over wide limits.

As many apparently widely different embodiments of this invention may be made without departing from the spirit thereof, it is understood that I do not limit myself to the foregoing embodiments or description except as indicated in the following claims.

I claim:

1. A power booster, comprising a power unit provided with a tapered actuating rod, a concave-faced pressure disc, a plurality of ball bearings interposed between the tapered end of the actuating rod and the face of the pressure disc, and a power head surrounding the actuating rod and preventing movement of the ball bearings in other than a lateral direction, whereby, upon the movement of the actuating rod, its tapered end will force the ball bearings apart against the resistance offered by the pressure disc and deliver a greater pressure against the face of the pressure disc than would be delivered were the actuating rod to bear directly thereagainst.

2. A power booster, comprising a housing, a pressure disc therein provided with an inwardly tapering face, a plurality of ball bearings arranged thereagainst, and a tapered actuating means arranged at a point equidistant from the centers of the ball bearings and adapted, when pressed against the ball bearings, to cause the latter to separate and ride up the tapering face of the pressure disc.

3. The pressure disc of claim 2, in which means are provided for guiding the tapered member and for resiliently forcing said pressure disc against the ball bearings and causing the latter to bear against the end of said guide means.

4. A power booster, comprising a 2-part housing, a pressure disc disposed therein and provided with an inwardly tapering face, a tapered actuating means, a guide therefor, a plurality of ball bearings disposed between said guide and said pressure disc with the end of the actuating means arranged equidistantly from the centers of the ball bearings, spring-pressed retaining rods holding the pressure disc in contact with the ball bearings, a dust cap for the housing and retaining rods, and a resilient means for yieldingly holding the parts of the housing in contact.

5. A power unit assembly, comprising a concave-faced pressure disc, a tapered plunger, means for actuating said tapered plunger, and a ball bearing power transmitting means arranged between the tapered plunger and the pressure disc, said assembly being adapted when the plunger is pressed against the ball bearing means to cause the latter to separate and ride up the concave-faced pressure disc.

6. The power unit assembly of claim 5, in which the power is supplied by a pneumatically operated power unit.

7. The power unit assembly of claim 5, in which the power is supplied by a mechanically operated power unit.

8. The power unit assembly of claim 5, in which the power is supplied by a mechanically operated lever, one end of which presses against the opposite end of the tapered plunger.

9. A brake mechanism, comprising a wheel hub, a braking disc carried thereby, a double-jawed brake disposed on opposite sides of the braking disc, brake lining disposed in said jaws and on opposite sides of the braking disc, spring-controlled means for yieldingly holding said brake jaws together, a power booster provided with a pressure disc which has an inwardly tapering face, a plurality of ball bearings in contact with said tapering face, a pointed plunger arranged at a point equidistant from the centers of the ball bearings, and actuating means for forcing said plunger into contact with the ball bearings to spread them apart and cause them to ride up the tapering face of the pressure disc and force the latter into contact with the brake lining to apply the brake.

10. The brake mechanism of claim 9, in which the braking disc is arranged externally of the wheel hub.

11. The brake mechanism of claim 9, in which the braking disc is arranged internally of the wheel hub.

12. A brake mechanism, comprising a wheel hub, a braking disc mounted circumferentially thereon, a plurality of open-jawed power booster brakes arranged at intervals around said braking disc, and means for actuating said power boosters, each of said power boosters comprising a concave-faced pressure disc, a pointed actuating means, a plurality of ball bearings disposed between said pointed actuating means and said pressure disc, and means for retaining said ball bearings thereagainst.

13. The brake mechanism of claim 12, in which the braking disc is arranged externally of the wheel hub.

14. The brake mechanism of claim 12, in which the braking disc is arranged internally of the wheel hub.

JESSE G. HAWLEY.